(12) United States Patent
Kim

(10) Patent No.: US 6,348,951 B1
(45) Date of Patent: Feb. 19, 2002

(54) CAPTION DISPLAY DEVICE FOR DIGITAL TV AND METHOD THEREOF

(75) Inventor: Man Hyo Kim, Anyang (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/511,311

(22) Filed: Feb. 23, 2000

(30) Foreign Application Priority Data

Feb. 3, 1999 (KR) .............................................. 99/6792

(51) Int. Cl.$^7$ .............................................. H04N 5/445
(52) U.S. Cl. ........................ 348/564; 348/468; 348/589
(58) Field of Search .................................. 348/564, 563, 348/569, 468, 584, 589, 598, 600; H04N 5/445, 9/74, 9/76

(56) References Cited

U.S. PATENT DOCUMENTS 5,859,660 A * 1/1999 Perkins ........................ 348/584
5,999,225 A * 12/1999 Yagasaki .................... 348/564

* cited by examiner

Primary Examiner—Sherrie Hsia

(57) ABSTRACT

A caption display device for a digital TV enables the users to adjust density of a caption window displayed on a screen of the digital TV. The caption display device for the digital TV includes: a video decoder unit for decoding an inputted MPEG II transport stream, and separately outputting a user data for caption and an MPEG II video data; an ATV caption command decoder unit for decoding the user data separated in the video decoder unit, and outputting a data having a caption command and a caption text; a user interactive control unit for sensing an interactive data inputted from the user; a caption control unit for outputting a caption text background control command in order to control a blending rate by using the user interactive signal outputted from the user interactive control unit; a blending unit for blending the ATV caption data separated in the ATV caption command decoder unit with the caption text background control command outputted from the caption control unit, and outputting a Muxing data; a video combining unit for combining and outputting the MPEG II video data separated in the video decoder unit and the Muxing data outputted from the blending unit; and a video data processing unit for processing and outputting a color blending according to the signal outputted from the video combining unit.

7 Claims, 1 Drawing Sheet

CAPTION DISPLAY DEVICE FOR DIGITAL TV AND METHOD THEREOF

BACKGROUND OF THE INVENTION

1. Field of the Invention

The present invention relates to a digital TV, and in particular to a caption display device for a digital TV and a method thereof.

2. Description of the Background Art

Currently, a caption device for an NTSC analog TV displays a caption of a predetermined size at a predetermined position of a screen (as transmitted from a broadcasting station).

That is, when an image screen and a caption are displayed at the same time, the caption partially covers the image, and thus the hidden image cannot be seen. A caption window is not defined in the analog caption. Accordingly, there is no solution although the caption of a predetermined size and position transmitted from the broadcasting station covers a part of the image screen.

In the case of a digital TV broadcasting caption that will be serviced sooner or later, the caption windows of a different size are supported. But when a few caption windows are simultaneously displayed on the screen, the image screen is hidden in proportion to the caption windows. As a result, a part of the TV image screen cannot be seen.

As described above, the background of the caption text and the caption window partially cover the TV image screen. In this regard, the users strongly demand service improvements.

SUMMARY OF THE INVENTION

Accordingly, an object of the present invention is to provide a caption display device for a digital TV enabling the users to adjust density of a caption window displayed on a screen of the digital TV.

In order to achieve the above-described object of the present invention, there is provided a caption display device for a digital TV including: a video decoder unit for decoding an inputted MPEG II transport stream, and separately outputting a user data for caption and an MPEG II video data; an ATV caption command decoder unit for decoding the user data separated in the video decoder unit, and outputting a data having a caption command and a caption text; a user interactive control unit for sensing an interactive data inputted from the user; a caption control unit for outputting a caption text background control command in order to control a blending rate by using the user interactive signal outputted from the user interactive control unit; a blending unit for blending the ATV caption data separated in the ATV caption command decoder unit with the caption text background control command outputted from the caption control unit, and outputting a Muxing data; a video combining unit for combining and outputting the MPEG II video data separated in the video decoder unit and the Muxing data outputted from the blending unit; and a video data processing unit for processing and outputting a color blending according to the signal outputted from the video combining unit.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The gist of a caption display device for a digital TV in accordance with the present invention will now be explained to be short before the detailed description thereof. The object of the present invention relates to a function of modifying a position of a caption window or caption according to a user's intention and of restoring a hidden image, in the digital TV or analog NTSC TV. The present invention can be applied to a user interface circuit part of the conventional NTSC analog TV.

That is, when watching a caption program on TV, the user can freely watch the image screen and the caption text by variably adjusting density of a background color of the caption window or caption overlapped on the image, if necessary.

According to the present invention, in the case of the digital TV caption, a control block multiplexing capable of adjusting the caption window and color density is provided at a caption stream parser portion of a user data decoder block. When the present invention is applied to the NTSC analog TV, the control block multiplexing is provided in order to adjust the caption window and color density at a caption processor output terminal for NTSC.

In an interface circuit embodied in the same manner, a control block output is applied to an image signal input terminal of a video display processor, thereby variably adjusting a blending factor of an OSD in the video display processor.

In order to achieve the above-described objects of the present invention, the caption display device for the digital TV having a video decoder unit and an ATV caption command decoder unit includes: a user interactive control unit for sensing an interactive data inputted from the user; a caption control unit for outputting a caption text background control command in order to control a blending rate by using the user interactive signal outputted from the user interactive control unit; a blending unit for blending the ATV caption data separated in the ATV caption command decoder unit with the caption text background control command multiplexed in the caption control unit, and outputting a Muxing data; a video combining unit for combining and outputting the MPEG II video data separated in the video decoder unit and the Muxing data outputted from the blending unit; and a video data processing unit for processing and outputting a color blending according to the signal outputted from the video combining unit.

Figure 1:
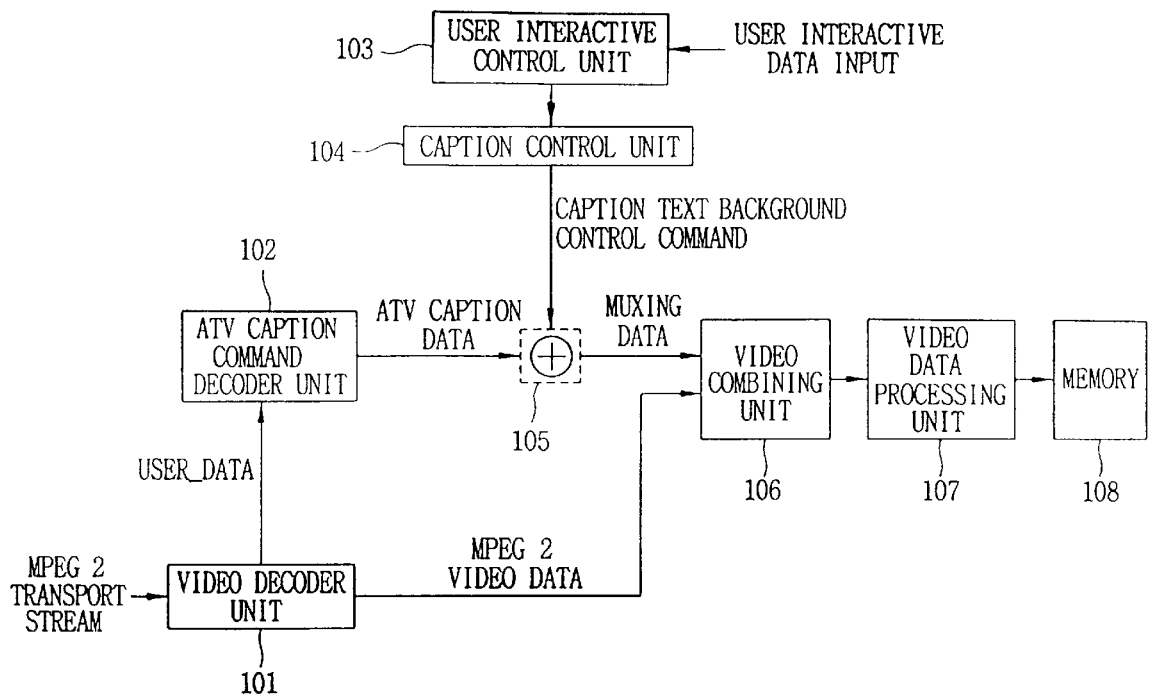
FIG. 1 illustrates a caption display device for a digital TV in accordance with a preferred embodiment of the present invention.

FIG. 1 illustrates a structure of the caption display device for the digital TV in accordance with the preferred embodiment of the present invention. As shown therein, the caption display device for the digital TV includes: a video decoder unit 101 for decoding an inputted MPEG II transport stream, and separately outputting a user data for caption and an MPEG II video data; an ATV caption command decoder unit 102 for decoding the user data separated in the video decoder unit 101, and outputting an ATV caption data having a caption command and a caption text; a user interactive control unit 103 for sensing an interactive data inputted from the user; a caption control unit 104 for outputting a caption text background control command in order to control a blending rate by multiplexing the user interactive signal outputted from the user interactive control unit 103; a blending unit 105 for blending the ATV caption data separated in the ATV caption command decoder unit 102 with the caption text background control command multiplexed in the caption control unit 104, and outputting a Muxing data; a video combining unit 106 for combining and outputting the MPEG II video data separated in the video decoder unit 101 and the Muxing data outputted from the blending unit 105; a video data processing unit 107 for processing and outputting a color blending according to the signal outputted from the video combining unit 106; and a memory 108 for storing the data processed in the video data processing unit 107. The ATV caption data consists of the caption command and the caption text.

Figure 2:
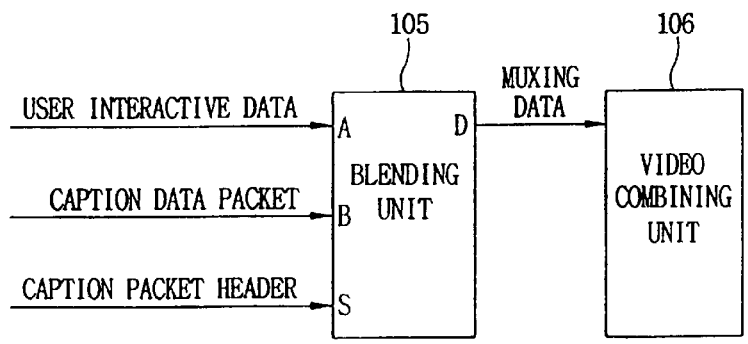
FIG. 2 is a detailed structure diagram of a blending unit in FIG. 1.

FIG. 2 illustrates a detailed structure of the blending unit in FIG. 1.

The operation of the caption display device for the digital TV in accordance with the present invention will now be described in detail with reference to the accompanying drawings.

First, the video decoder unit 101 decodes the inputted MPEG II transport stream, and separately outputs the user data for caption and the MPEG II video data.

The ATV caption command decoder unit 102 decodes the user data separated in the video decoder unit 101, and outputs the ATV caption data including the caption command and the caption text.

That is, the ATV caption command decoder unit 102 decodes the user data separated in the video decoder unit 101, and outputs the ATV caption data including the caption command and the caption text as shown in Table 1.

TABLE 1

| 0 | 1 | 1 |   | 0 | 0 | 1 | 0 | 1 |
|---|---|---|---|---|---|---|---|---|
|   |   |   | Caption data 0 |   |   |   |   |   |
|   |   |   | Caption data 1 |   |   |   |   |   |
|   |   |   | Caption data 2 |   |   |   |   |   |
|   |   |   | Caption data 3 |   |   |   |   |   |
|   |   |   | Caption data 4 |   |   |   |   |   |

In the above Table 1, the ATV caption command decoder unit 102 has a header of 1 byte (or 2 bytes) consisting of upper 3 bits indicating a service number and lower 5 bits indicating a size. The caption data after the header becomes a caption displayed on the screen.

In addition, the user interactive control unit 103 senses the interactive data inputted from the user, and outputs a corresponding signal.

That is, a dedicated register in the user interactive control unit 103 senses the interactive data inputted from the user, reflects the data in a circuit method, and outputs the signal corresponding to the data.

The caption control unit 104 multiplexes the user interactive signal, and outputs the caption text background control command to control the blending rate.

That is, the caption control unit 104 multiplexes the user interactive signal outputted from the user interactive control unit 103, and outputs the caption text background control command in order to control the blending rate of 8 bits (extendable to 16 bits) as shown in Table 2. At this time, in the case of 8 bits, 256 blending factors can be made, and in the case of 16 bits, the blending factor can be made similarly to the real colors.

TABLE 2

8 bits or 16 bits

The blending unit 105 blends the ATV caption data separated in the ATV caption command decoder unit 102 with the caption text background control command multiplexed in the caption control unit 104, and outputs the Muxing data.

That is, as illustrated in FIG. 2, the blending unit 105 blends the ATV caption packet header separated in the ATV caption command decoder unit 102 with the ATV caption data packet and the caption text background control command of the user interactive data which is an output from the caption control unit 104, thereby outputting the Muxing data.

The video combining unit 106 combines and outputs the MPEG II video data separated in the video decoder unit 101 and the Muxing data outputted from the blending unit 105.

That is, the video combining unit 106 combines the MPEG II video data separated in the video decoder unit 101 and the Muxing data outputted from the blending unit 105, and outputs a signal for controlling a color blending factor.

The video data processing unit 107 processes the color blending according to the control signal outputted from the video combining unit 106, stores it in the memory, and outputs it to be displayed on the image screen as a caption.

At the time, the data outputted from the video data processing unit 107 embodies the caption having a complementary color to the image screen in each frame under the user interactive control.

As discussed earlier, the caption display device for the digital TV in accordance with the present invention can enable the user to control density of the caption window displayed on the screen of the digital TV. As a result, the image screen that can not be seen due to the background of the caption text is restored, and thus the user can watch the maximum TV image screen with the caption.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A caption display device for a digital TV, comprising:
   a video decoder unit for decoding an inputted MPEG II transport stream, and separately outputting a user data for caption and an MPEG II video data;
   an ATV caption command decoder unit for decoding the user data separated in the video decoder unit, and outputting a data including a caption command and a caption text;
   a user interactive control unit for sensing an interactive data inputted from the user;
   a caption control unit for outputting a caption text background control command in order to control a blending rate by using a user interactive signal outputted from the user interactive control unit;
   a blending unit for blending an ATV caption data separated in the ATV caption command decoder unit with the caption text background control command outputted from the caption control unit, and outputting a Muxing data;

a video combining unit for combining and outputting the MPEG II video data separated in the video decoder unit and the Muxing data outputted from the blending unit; and a video data processing unit for processing and outputting a color blending according to a signal outputted from the video combining unit.

2. The device according to claim 1, wherein the ATV caption command decoder unit comprises a header of 1 byte consisting of upper 3 bits indicating a service number and lower 5 bits indicating a size.

3. The device according to claim 1, wherein the user interactive control unit comprises a dedicated register of 8 bits or 16 bits.

4. The device according to claim 1, wherein the caption control unit outputs the caption text background control command in order to control a blending rate of 8 bits or 16 bits.

5. The device according to claim 1, wherein the blending unit blends an ATV caption packet header separated in the ATV caption command decoder unit with the ATV caption data and the caption text background control command outputted from the caption control unit, and outputs the Muxing data.

6. A caption display device for a digital TV, comprising:

an extract unit for separately extracting a user data and an MPEG II video data from an MPEG II transport stream;

a control unit for sensing an interactive data inputted from the user, and outputting a caption text background control command in order to control a blending rate;

a data processing unit for receiving the user data, outputting an ATV caption data, blending the ATV caption data with the caption text background control command, and outputting a Muxing data; and an output unit for combining the MPEG II video data and the Muxing data, and processing and outputting a color blending.

7. A caption display method for a digital TV, comprising:

a first step for separately extracting a user data and an MPEG II video data from an MPEG II transport stream;

a second step for sensing an interactive data inputted from the user, and outputting a caption text background control command in order to control a blending rate;

a third step for receiving the user data, outputting an ATV caption data, blending the ATV caption data with the caption text background control command, and outputting a Muxing data; and a fourth step for combining the MPEG II video data and the Muxing data, and processing and outputting a color blending.

* * * * *